US012612017B2

(12) United States Patent　　　(10) Patent No.:　US 12,612,017 B2
Ikeda et al.　　　　　　　　　　　(45) Date of Patent:　Apr. 28, 2026

(54) VEHICLE CONTROL DEVICE AND VEHICLE

(71) Applicant: Isuzu Motors Limited, Yokohama (JP)

(72) Inventors: Yuta Ikeda, Fujisawa (JP); Hitoshi Miyagawa, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 35 days.

(21) Appl. No.: 18/727,378

(22) PCT Filed: Jan. 6, 2023

(86) PCT No.: PCT/JP2023/000144
§ 371 (c)(1),
(2) Date: Jul. 9, 2024

(87) PCT Pub. No.: WO2023/136206
PCT Pub. Date: Jul. 20, 2023

(65) Prior Publication Data
US 2025/0083647 A1　　Mar. 13, 2025

(30) Foreign Application Priority Data
Jan. 11, 2022　(JP) ................................. 2022-002571

(51) Int. Cl.
*B60T 7/12*　　　　(2006.01)
*B60L 15/20*　　　(2006.01)
(52) U.S. Cl.
CPC ............. *B60T 7/12* (2013.01); *B60L 15/2018* (2013.01); *B60T 2210/20* (2013.01); *B60T 2250/02* (2013.01)

(58) Field of Classification Search
CPC .... B60T 7/12; B60T 2210/20; B60T 2250/02; B60T 7/122; B60T 2201/06;
(Continued)

(56) References Cited

U.S. PATENT DOCUMENTS 5,378,053 A * 1/1995 Patient .................... B60L 3/108
303/3
2017/0087994 A1　3/2017　Kakisako
(Continued)

FOREIGN PATENT DOCUMENTS

CN　　　105235549 A　*　1/2016
JP　　　08-282456　　　10/1996
(Continued)

OTHER PUBLICATIONS

Translation of JP 2008052316 (Year: 2008).*
CN104235549A—original and translation. (Year: 2016).*

*Primary Examiner* — Frederick M Brushaber

(57) ABSTRACT
This vehicle control device comprises: a slope movement start assistance unit that maintains a braking force until elapse of a predetermined period since execution of a braking release operation for releasing a braking force applied to the wheels of a vehicle equipped with a motor serving as a power source such that the vehicle does not go down a slope; an acquisition unit that acquires each of the gradient of a road surface on which the vehicle is stopped and the total weight of the vehicle; and a control unit that executes control for causing the motor to generate, in the predetermined period, a threshold torque that corresponds to each of the gradient of the road surface on which the vehicle is stopped and the total weight of the vehicle.

4 Claims, 5 Drawing Sheets

(58) Field of Classification Search
 CPC .. B60L 15/2018; B60L 15/2081; B60L 15/20;
 Y02T 10/72
 See application file for complete search history.

(56) References Cited

U.S. PATENT DOCUMENTS

| | | | |
|---|---|---|---|
| 2024/0022757 A1* | 1/2024 | Chen ....................... | H04N 19/52 |
| 2025/0083647 A1* | 3/2025 | Ikeda ....................... | B60T 7/122 |

FOREIGN PATENT DOCUMENTS

| | | | |
|---|---|---|---|
| JP | 11-123957 | | 5/1999 |
| JP | 2004-180437 | | 6/2004 |
| JP | 2008052316 A | * | 3/2008 |
| JP | 2009-213227 | | 9/2009 |
| JP | 2014-162319 | | 9/2014 |
| JP | 2017-063575 | | 3/2017 |
| JP | 2020-039224 | | 3/2020 |

* cited by examiner

| OVERALL WEIGHT W OF VEHICLE | GRADIENT $\theta$ OF STOPPED ROAD SURFACE | | | | | |
|---|---|---|---|---|---|---|
| | $0 < \theta \leqq \theta 1$ | $\theta 1 < \theta \leqq \theta 2$ | ... | $\theta m-1 < \theta \leqq \theta m$ | $\theta m \leqq \theta$ | |
| $0 < W \leqq W1$ | ***** | ***** | ... | | ***** | |
| $W1 < W \leqq W2$ | ***** | ***** | ... | ***** | ***** | |
| ... | ... | ... | ... | ... | ... | |
| $Wn-1 < W \leqq Wn$ | ***** | ***** | ... | ***** | ***** | |
| $Wn \leqq W$ | ***** | ***** | ... | ***** | ***** | |

FIG. 4

VEHICLE CONTROL DEVICE AND VEHICLE

TECHNICAL FIELD

The present disclosure relates to a control device for a vehicle (herein also simply referred to as "vehicle control device") and a vehicle.

BACKGROUND ART

Known is a slope start assist device that maintains braking force applied to the wheels of a vehicle even when the brake pedal is released while the vehicle is stopped on a slope road.

For example, a slope start assist device is disclosed as follows: in a vehicle including a motor as a drive source, the slope start assist device performs a lock release operation of a parking brake lock mechanism on condition that the brake operation is released and motoring torque is generated in the motor (see, for example, Patent Literature (hereinafter, referred to as PTL) 1).

CITATION LIST

Patent Literature

PTL 1
  Japanese Patent Application Laid-Open No. 2014-162319

SUMMARY OF INVENTION

Technical Problem

In the slope start assist device disclosed in PTL 1, when the motoring torque is set high to prevent the vehicle from sliding down on a slope road, a phenomenon in which the vehicle suddenly starts may occur on level ground when the maintaining of the braking force applied to the wheels is released. On the other hand, when the motoring torque is set low to prevent the vehicle from suddenly starting on flat ground, for example, a vehicle on a slope road may inadvertently slide down by L1 [m] during time period t1 [sec] from the release of the maintaining of the braking force in the vehicle, as illustrated in FIG. 1.

An object of the present disclosure is to provide a vehicle control device and a vehicle each capable of preventing the phenomenon of the vehicle suddenly starting on level ground and preventing the vehicle from sliding down on a slope road.

Solution to Problem

To achieve the object, a control device for a vehicle in the present disclosure includes:

a slope starting assistance section that maintains braking force until a predetermined period of time elapses after a brake release operation is performed, wherein the braking force is maintained so that the vehicle including a motor as a power source does not slide down on a slope road, and the brake release operation is an operation for releasing the braking force applied to a wheel of the vehicle;

an acquisition section that acquires a gradient of a road surface on which the vehicle is stopped and an overall weight of the vehicle; and a control section that executes control to cause the motor to generate, in the predetermined period of time, threshold torque in accordance with the gradient of the road surface on which the vehicle is stopped and the overall weight of the vehicle.

A vehicle in the present disclosure includes the vehicle control device described above.

Advantageous Effects of Invention

The present disclosure enables preventing the phenomenon of a vehicle suddenly starting on level ground and preventing the vehicle from sliding down on a slope road.

BRIEF DESCRIPTION OF DRAWINGS

FIG. 4 illustrates a table in which each threshold torque is associated with the gradient of a stopped road surface and the overall weight of a vehicle;

DESCRIPTION OF EMBODIMENTS

Hereinafter, an embodiment of the present disclosure will be described with reference to the drawings.

Figure 1:
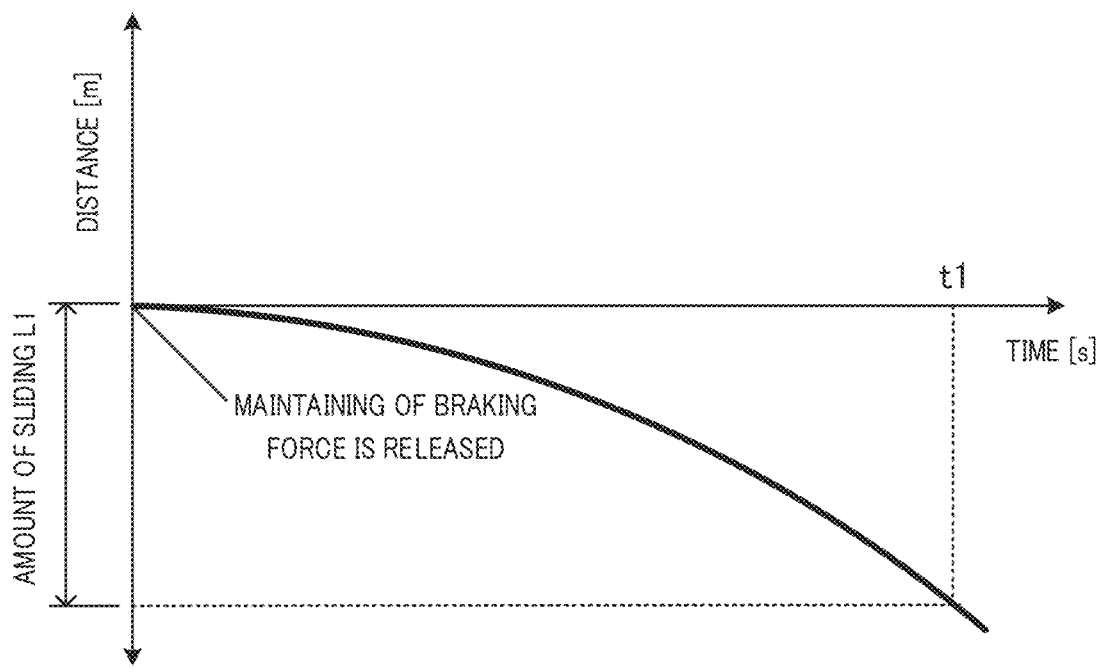
FIG. 1 illustrates the relationship between the elapsed time after the maintaining of the braking force is released and the amount of sliding.
Figure 2:
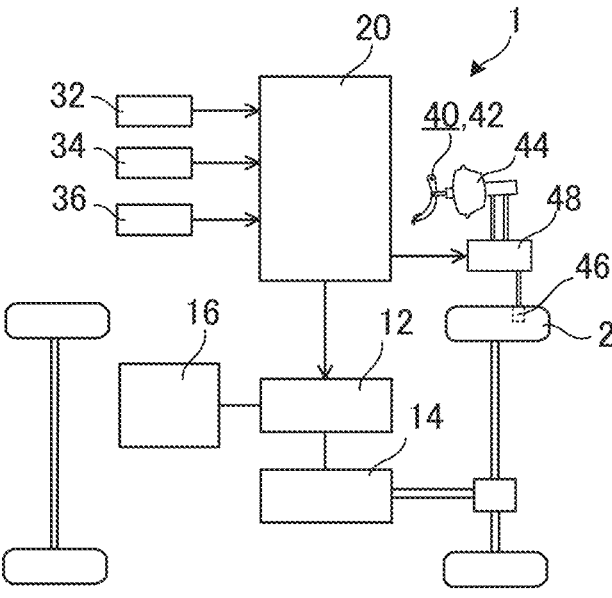
FIG. 2 is a configuration diagram schematically illustrating the configuration of a vehicle.

FIG. 2 is a configuration diagram schematically illustrating the configuration of vehicle 1. Vehicle 1 is an electric vehicle including drive wheels 2. Vehicle 1 includes power control section 12, motor generator 14, battery 16, control device 20, gradient sensor 32, acceleration sensor 34, and torque sensor 36.

Power control section 12 is connected to battery 16. Electric power from battery 16 is supplied to motor generator 14 via power control section 12. Motor generator 14 functions as a motor that generates motoring torque using the supplied electric power from battery 16. The motoring torque of motor generator 14 drives drive wheel 2.

Motor generator 14 functions as a power generator when rotational force is applied from drive wheels 2 during braking. Electric power generated by motor generator 14 is stored in battery 16 via power control section 12.

Brake device 40 includes brake pedal 42 operated by the driver, master cylinder 44 that generates brake fluid pressure according to the amount of depression of brake pedal 42, disc rotor 46 provided at drive wheel 2, a caliper (not illustrated) that brakes disc rotor 46, and brake actuator 48. Brake actuator 48 increases or decreases the brake fluid pressure transmitted from master cylinder 44 to the caliper. The caliper brakes disc rotor 46 as the brake fluid pressure increases during a braking operation using brake pedal 42. In other words, braking force is applied to drive wheels 2. As the brake fluid pressure decreases during a brake release operation using brake pedal 42, the braking force applied to drive wheels 2 is released.

In the present embodiment, while vehicle 1 is stopped on a slope road, brake actuator 48 is controlled to maintain the braking force applied to drive wheels 2 until a predetermined period of time elapses after the brake release operation using brake pedal 42 is performed. Brake actuator 48 corresponds to the "slope starting assistance section" of the present disclosure.

Gradient sensor 32 detects the gradient of the road surface on which vehicle 1 is stopped. The detection result of gradient sensor 32 (the gradient of the stopped road surface) is input to control device 20.

Acceleration sensor 34 detects the acceleration of the vehicle (herein also simply referred to as "vehicle acceleration"). The detection result (vehicle acceleration) of acceleration sensor 34 is input to control device 20.

Torque sensor 36 detects the rotation speed, rotation direction, and the like of the motor. The detection result of torque sensor 36 is input to control device 20.

Control device 20 includes a central processing unit (CPU), a read only memory (ROM), an electrically erasable programmable read only memory (EEPROM), a random access memory (RAM), an input port, an output port, and the like. The CPU of control device 20 loads predetermined programs stored in the ROM into the RAM and executes various functions.

Figure 3:
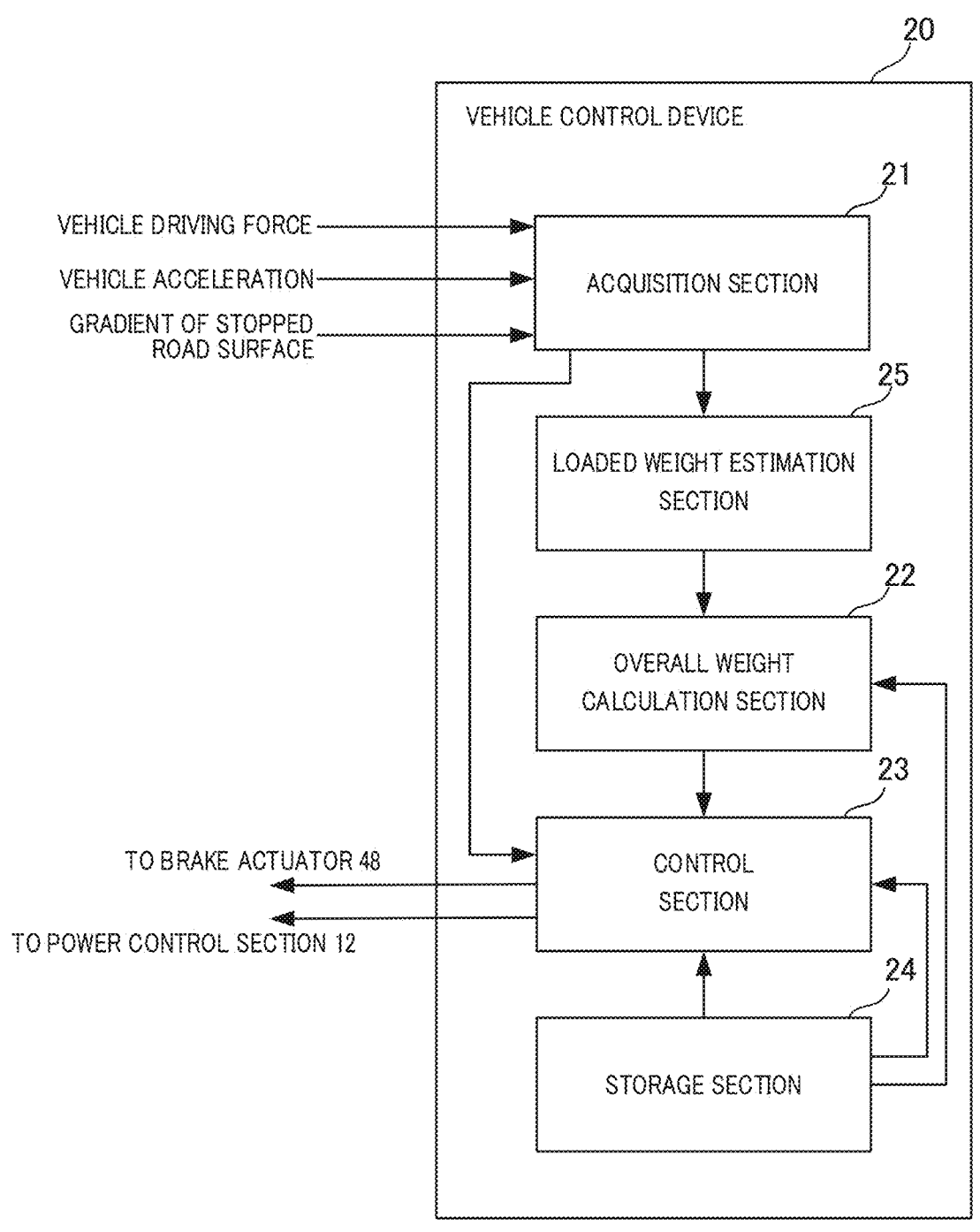
FIG. 3 is a configuration block diagram illustrating the configuration of a vehicle control device.

FIG. 3 is a configuration block diagram illustrating the configuration of control device 20. Control device 20 includes acquisition section 21, overall weight calculation section 22, control section 23, storage section 24, and loaded weight estimation section 25, as various functions.

Acquisition section 21 acquires the detection result (the gradient of the stopped road surface) of gradient sensor 32. Acquisition section 21 also acquires the detection result (vehicle acceleration) of acceleration sensor 34. Acquisition section 21 also acquires the detection result (driving force of the vehicle (herein also simply referred to as "vehicle driving force")) of torque sensor 36.

Loaded weight estimation section 25 estimates the loaded weight of a cargo loaded on the loading platform of a vehicle based on the relationship between the vehicle acceleration and the vehicle driving force.

Overall weight calculation section 22 calculates an overall weight by adding the loaded weight estimated by loaded weight estimation section 22 to a vehicle weight stored in advance. Here, the "vehicle weight" is the weight of the vehicle itself, is constant for each vehicle type, and is stored in advance in storage section 24. Storage section 24 storing the vehicle weight data is, for example, a ROM.

FIG. 4 illustrates a table in which each threshold torque is associated with the gradient of a stopped road surface and the overall weight of a vehicle. As illustrated in FIG. 4, the gradient θ is divided into (m+1) sections. The overall weight W is divided into (n+1) sections. Herein, m and n are each integers of 1 or more. The segmentation of the gradient of the stopped road surface and the overall weight of the vehicle, the number of the sections, and the threshold torque associated with the gradient of a stopped road surface and the overall weight of a vehicle can be determined through experiments and simulations.

Control section 23 determines the threshold torque based on the gradient of the stopped road surface and the overall weight of the vehicle with reference to the table illustrated in FIG. 4. The table illustrated in FIG. 4 is stored in advance in storage section 24. The threshold torque may be calculated by referring to a predetermined mathematical expression based on the gradient of a stopped road surface and the overall weight of a vehicle.

Control section 23 controls brake actuator 48 to maintain the braking force applied to drive wheels 2 until a predetermined period of time elapses after the brake release operation using brake pedal 42 is performed. Control section 23 also controls motor generator 14 via power control section 12 so that motor generator 14 generates threshold torque in a predetermined period of time.

Figures 5A, 5B, 5C:
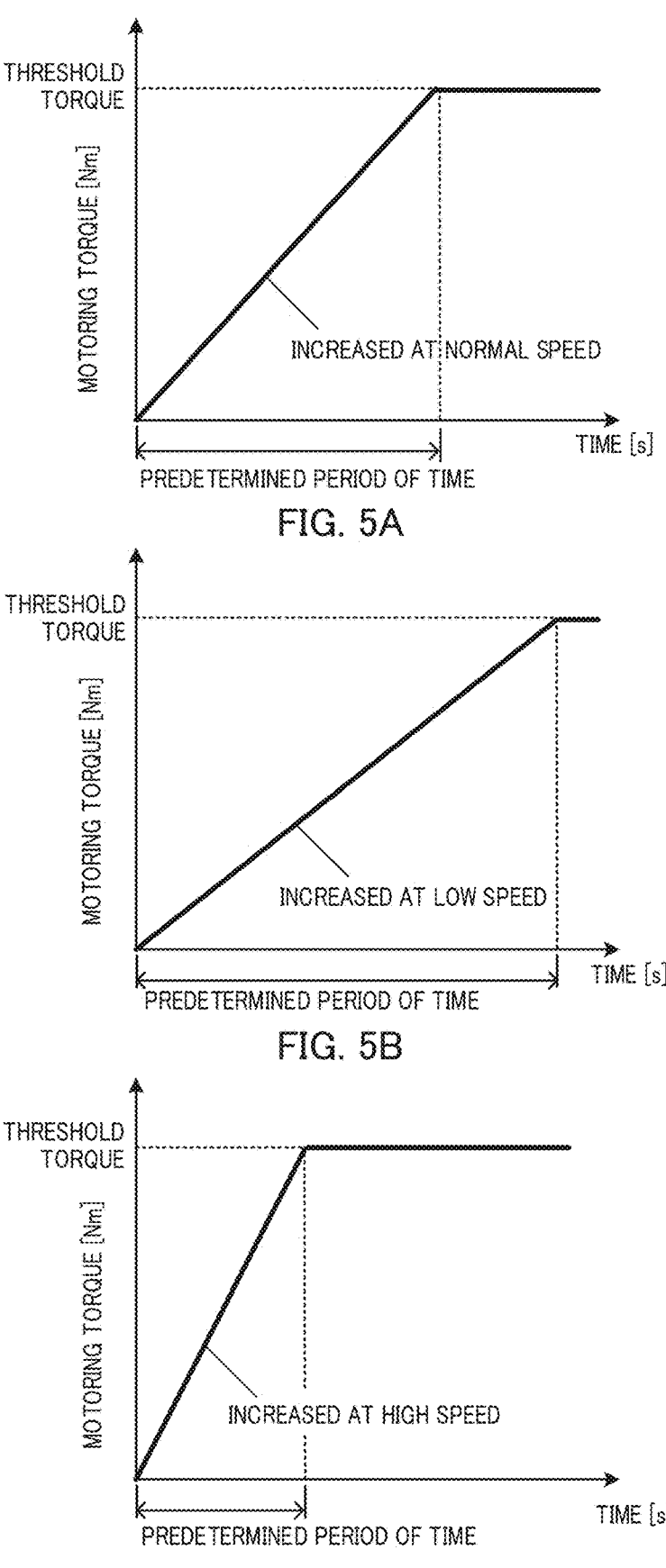
FIG. 5A illustrates the relationship between motoring torque that increases at a normal speed and a predetermined period of time.
FIG. 5B illustrates the relationship between motoring torque that increases at low speed and a predetermined period of time.
FIG. 5C illustrates the relationship between motoring torque that increases at high speed and a predetermined period of time.

FIG. 5A illustrates the relationship between motoring torque that increases at a normal speed and a predetermined period of time. Control section 23 controls motor generator 14 so that the motoring torque increases at the normal speed illustrated in FIG. 5A. As illustrated in FIG. 5A, the motoring torque thus reaches the threshold torque in the predetermined period of time.

Control section 23 controls brake actuator 48 to release the maintaining of the braking force applied to drive wheels 2 when motor generator 14 generates the threshold torque. In other words, control section 23 controls brake actuator 48 to maintain the braking force applied to drive wheels 2 until motor generator 14 generates the threshold torque.

Figure 6:
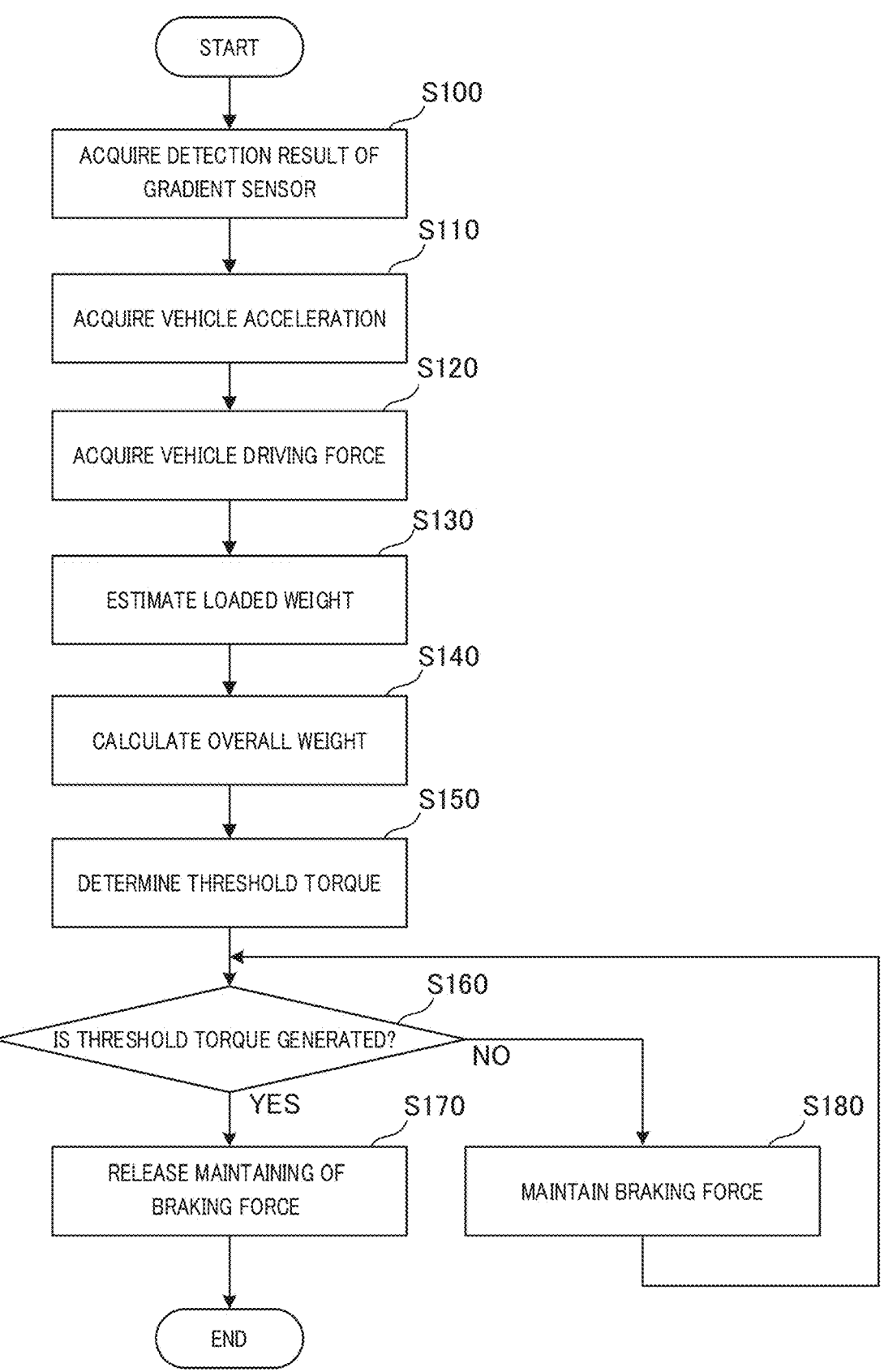
FIG. 6 is a flowchart illustrating an example of the operation of the vehicle control device.

Next, an example of the operation of vehicle control device 20 will be described with reference to FIG. 6. FIG. 6 is a flowchart illustrating an example of the operation of the vehicle control device. The flow begins when the power switch is turned on. Each function of control device 20 will be described as being implemented by a CPU.

First, in step S100, the CPU acquires the detection result (the gradient of the stopped road surface) of gradient sensor 32.

Next, in step S110, the CPU acquires the detection result (vehicle acceleration) of acceleration sensor 34.

Next, in step S120, the CPU acquires the detection result (vehicle driving force) of torque sensor 36.

Next, in step S130, the CPU estimates the loaded weight based on the relationship between the vehicle acceleration and the vehicle driving force.

Next, in step S140, the CPU adds the estimated loaded weight to a vehicle weight stored in advance.

Next, in step S150, the CPU determines the threshold torque based on the gradient of the stopped road surface and the overall weight of the vehicle with reference to the table illustrated in FIG. 4.

Next, in step S160, the CPU determines whether motor generator 14 generates the threshold torque. When the threshold torque is generated (step S160: YES), the processing transitions to step S170. When the threshold torque is not generated (step S160: NO), the processing transitions to step S180.

In step S170, the CPU controls brake actuator 48 to release the maintaining of the braking force applied to drive wheels 2.

In step S180, the CPU controls brake actuator 48 to maintain the braking force applied to drive wheels 2. After that, the processing returns to before step S160.

Control device 20 according to the present disclosure includes: brake actuator 48 that maintains braking force until a predetermined period of time elapses after a brake release operation is performed (the braking force is maintained so that the vehicle including motor generator 14 as a power source does not slide down on a slope road, and the brake release operation is an operation for releasing the braking force applied to drive wheels 2 of the vehicle); acquisition section 21 that acquires a gradient of a road surface on which vehicle 1 is stopped and an overall weight of vehicle 1; and control section 23 that executes control to cause motor generator 14 to generate, in the predetermined period of time, threshold torque in accordance with the gradient of the road surface on which vehicle 1 is stopped and the overall weight of the vehicle.

According to the above configuration, the lower the gradient of a stopped road surface and the lighter the overall weight, the lower the threshold torque becomes, preventing the phenomenon of vehicle 1 suddenly starting on level ground. In addition, the higher the gradient of a stopped road surface and the heavier the overall weight, the higher the threshold torque becomes, preventing vehicle 1 from sliding down on a slope road.

In control device 20 according to the above embodiment, control section 23 controls brake actuator 48 to release the maintaining of the braking force when motor generator 14 generates threshold torque. With such a configuration, the motoring torque has reached the threshold torque when the maintaining of the braking force is released, and therefore, it is possible to prevent vehicle 1 from sliding down.

In control device 20 according to the above embodiment, control section 23 controls brake actuator 48 to maintain the braking force until motor generator 14 generates the threshold torque. With such a configuration, the maintaining of the braking force is not released in a state where the motoring torque does not reach the threshold torque, and therefore, it is possible to prevent vehicle 1 from sliding down.

In the above embodiment, motor generator 14 is controlled in such a way that the motoring torque increases at the normal speed illustrated in FIG. 5A, but the present disclosure is not limited to this configuration. For example, the speed at which the motoring torque increases may be lower than the normal speed or higher than the normal speed. FIG. 5B illustrates the relationship between motoring torque that increases at low speed and a predetermined period of time. FIG. 5C illustrates the relationship between motoring torque that increases at high speed and a predetermined period of time. The number of lengths of the predetermined periods of time (rates of increase in motoring torque) is not limited to three, but may be any number. The length of the predetermined period of time may be selected, for example, by the user or may be automatically selected based on the gradient of a stopped road surface or the overall weight of a vehicle. In this case, control section 23 executes control to generate the threshold torque in a predetermined period of time selected from a plurality of predetermined periods of time set to have a plurality of lengths respectively.

In vehicle control device 20 according to the above embodiment, overall weight calculation section 22 calculates a total value (sum of the loaded weight and the vehicle weight) as the overall weight, but the present disclosure is not limited to this configuration. For example, the weight of the person (people) in the vehicle may be added to the total value to obtain the overall weight.

Vehicle control device 20 according to the above embodiment includes loaded weight estimation section 25 estimating the loaded weight based on the vehicle driving force and the vehicle acceleration, but the present disclosure is not limited to this configuration. For example, a weight sensor may be provided on a loading platform on which a cargo is loaded. In this case, the weight sensor detects the weight of the cargo loaded on the loading platform. The detection result (loaded weight) of the weight sensor is input to control device 20.

The embodiment described above are merely an example of implementation of the present disclosure, and the technical scope of the present disclosure should not be construed as limited by the embodiment. That is, the present disclosure can be implemented in various forms without departing from the gist or main features thereof.

This application is entitled to and claims the benefit of Japanese Patent Application No. 2022-002571 filed on Jan. 11, 2022, the disclosure of which is incorporated herein by reference in its entirety.

INDUSTRIAL APPLICABILITY

The present disclosure is suitably utilized for a vehicle including a control device that is required to prevent the phenomenon of a vehicle suddenly starting on level ground and prevent the vehicle from sliding down on a slope road.

REFERENCE SIGNS LIST

1 Vehicle
2 Drive wheel
12 Power control section
14 Motor generator
16 Battery
20 Control device
21 Acquisition section
22 Overall weight calculation section
23 Control section
24 Storage section
25 Loaded weight estimation section
32 Gradient sensor
34 Acceleration sensor
36 Torque sensor
40 Brake device
42 Brake pedal
44 Master cylinder
46 Disc rotor
48 Brake actuator

The invention claimed is:

1. A vehicle that includes a motor as a power source for driving wheels, a brake actuator applying brake force to the wheels, and a memory storing executable instructions that, in response to execution, cause a processor to perform operations comprising:

controlling the brake actuator that maintains braking force until a predetermined period of time elapses after a brake release operation is performed, wherein the braking force is maintained so that the vehicle does not slide down on a sloped road, and wherein the brake release operation releases the braking force applied to a wheel of the vehicle;

acquiring a gradient of a road surface on which the vehicle is stopped and an overall weight of the vehicle; and executing control to cause the motor to generate, in the predetermined period of time, threshold torque in accordance with the gradient of the road surface on which the vehicle is stopped and the overall weight of the vehicle so that the vehicle does not slide down on a sloped road after the predetermined period of time, wherein the predetermined period of time is selected from a plurality of predetermined periods of time set to have a plurality of lengths respectively.

2. The vehicle according to claim 1, wherein the processor performs further operations comprising:

controlling the brake actuator to release maintaining of the braking force when the motor generates the threshold torque.

3. The vehicle according to claim 1, wherein the processor performs further operations comprising:

controlling the brake actuator to maintain the braking force until the motor generates the threshold torque.

4. The vehicle according to claim 1, wherein the processor performs further operations comprising:

calculating a total value as the overall weight, the total value being a sum of a weight of the vehicle stored in advance and a loaded weight that is a weight of a cargo loaded on a loading platform of the vehicle.

\* \* \* \* \*